US010691960B2

(12) United States Patent
Takagi et al.

(10) Patent No.: US 10,691,960 B2
(45) Date of Patent: Jun. 23, 2020

(54) SURROUNDING MONITORING APPARATUS

(71) Applicant: TOYOTA JIDOSHA KABUSHIKI KAISHA, Toyota-shi, Aichi-ken (JP)

(72) Inventors: Toshihiro Takagi, Nisshin (JP); Yuki Minase, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 133 days.

(21) Appl. No.: 15/958,619

(22) Filed: Apr. 20, 2018

(65) Prior Publication Data

US 2018/0307923 A1  Oct. 25, 2018

(30) Foreign Application Priority Data

Apr. 24, 2017 (JP) ................ 2017-085150

(51) Int. Cl.
*G06T 7/20* (2017.01)
*G06T 7/70* (2017.01)
*G06K 9/00* (2006.01)
*B60R 1/00* (2006.01)
*G06T 7/73* (2017.01)
*B60R 11/04* (2006.01)
*G06K 9/46* (2006.01)

(52) U.S. Cl.
CPC ............ *G06K 9/00805* (2013.01); *B60R 1/00* (2013.01); *B60R 11/04* (2013.01); *G06K 9/00362* (2013.01); *G06T 7/70* (2017.01); *G06T 7/73* (2017.01); *B60R 2300/301* (2013.01); *B60R 2300/302* (2013.01); *B60R 2300/8033* (2013.01); *G06T 2207/10016* (2013.01); *G06T 2207/30196* (2013.01); *G06T 2207/30261* (2013.01)

(58) Field of Classification Search
CPC ......... B60T 7/12; G06K 9/00805; G06T 7/20; G06T 7/70
USPC ............................................. 348/148; 382/103
See application file for complete search history.

(56) References Cited

U.S. PATENT DOCUMENTS

2018/0354506 A1* 12/2018 Minemura ............... B60T 7/12

FOREIGN PATENT DOCUMENTS

JP  2007-264778 A  10/2007
JP  2011-065338 A  3/2011

* cited by examiner

Primary Examiner — Albert Kir
(74) Attorney, Agent, or Firm — Hunton Andrews Kurth LLP

(57) ABSTRACT

A surrounding monitoring apparatus obtains the position of a pedestrian contained in an image captured by a camera mounted on a vehicle on the basis of the position of the pedestrian in the image, and determines, on the basis of the obtained position, whether or not the possibility of collision with the pedestrian is high. In the apparatus, an error in extracting the pedestrian position may increase temporarily. In view of this, when the magnitude of change in a position correlation value representing the position of the pedestrian per a predetermined time (position change amount) exceeds a change amount upper limit value, the apparatus modifies the position correlation value such that the position change amount becomes equal to the change amount upper limit value and determines, on the basis of the modified position correlation value, whether or not the possibility of collision with the pedestrian is high.

12 Claims, 9 Drawing Sheets

SURROUNDING MONITORING APPARATUS

CROSS-REFERENCE TO RELATED APPLICATION

The present application claims priority to Japanese Patent Application No. 2017-085150 filed on Apr. 24, 2017, which is incorporated herein by reference in its entirety.

BACKGROUND OF THE INVENTION

Field of the Invention

The present invention relates to a surrounding monitoring apparatus which determines whether or not a pedestrian contained in a captured image of a region in a heading direction of a vehicle (hereinafter also referred to as a "heading direction image") is highly likely to collide with the vehicle.

Description of the Related Art

One conventionally known surrounding monitoring apparatus of such a type (hereinafter also referred to as the "conventional apparatus") has two cameras (so-called stereoscopic camera) which photograph a region in the heading direction of a vehicle. The conventional apparatus obtains a pair of images at a proper timing through use of the two cameras. The conventional apparatus extracts the contour of a pedestrian from each of the two images and obtains the distance between the vehicle and the pedestrian on the basis of the parallax of the contour of the pedestrian between the two images.

In addition, the conventional apparatus obtains the height of the pedestrian and the degree of opening of the legs of the pedestrian. When the ratio (opening ratio) of the degree of opening of the legs to the height is large, the conventional apparatus presumes that the "angle between the heading direction of the pedestrian and the heading direction of the vehicle" is larger as compared with the case where the opening ratio is small, and determines that the pedestrian is highly likely to cross the travel path of the vehicle (see, for example, Japanese Patent Application Laid-Open (kokai) No. 2007-264778).

Incidentally, in some cases, such a surrounding monitoring apparatus has only one camera for photographing the region in the heading direction of the vehicle (so-called monocular camera). In such a case, the surrounding monitoring apparatus cannot obtain the distance between the vehicle and the pedestrian on the basis of the parallax. In view of this, such a surrounding monitoring apparatus may be designed to obtain (estimate) the distance between the vehicle and the pedestrian on the basis of the position of the pedestrian on the image. Specifically, the surrounding monitoring apparatus estimates that the higher the foot position of the pedestrian on the image, the larger the distance between the vehicle and the pedestrian.

However, if the error involved in extraction of the contour of the pedestrian contained in the image increases and thus the error involved in extraction of the foot position of the pedestrian in the image increases, the estimation error of the distance between the vehicle and the pedestrian increases. For example, if a puddle is present on the walking path of the pedestrian, the extraction error of the foot position may increases temporarily. Specifically, if an image of a foot of the pedestrian and an image of the "foot reflected in the puddle" appear adjacently in the heading direction image, the surrounding monitoring apparatus may extract the contour of the pedestrian in a state in which the apparatus erroneously recognizes the foot reflected in the puddle as a portion of the pedestrian. In such a case, the surrounding monitoring apparatus is highly likely to recognize the foot on the image to be located at a position lower than the actual foot position.

In the case where a road sign on the walking path of the pedestrian and the shoes of the pedestrian resemble each other in color, the extraction error of the foot position may increase temporarily. Specifically, when the contour of the pedestrian is extracted, the road sign may be extracted as a portion of the pedestrian. In the case where the color of the shoes of the pedestrian and the color of a road resemble each other, the shoes of the pedestrian are recognized as a background, which raises the possibility that portions of the pedestrian covered by the shoes are not extracted as a portion of the pedestrian.

If the error involved in the estimation of the distance between the vehicle and the pedestrian increases temporarily as a result of an increase in the extraction error of the foot position as in the above-described cases, it may become impossible to accurately determine whether or not the possibility of collision with that pedestrian is high. In view of the forgoing, one object of the present invention is to provide a surrounding monitoring apparatus which can accurately determine whether or not the possibility of collision of a vehicle with a pedestrian is high irrespective of a temporary increase in the error involved in extraction of the contour of the pedestrian contained in an image captured by a single camera.

SUMMARY OF THE INVENTION

A vehicle surrounding monitoring apparatus which achieves the above-described object (hereinafter also referred to as the "apparatus of the present invention") includes one camera, a pedestrian position obtainment section, a position processing section, and a collision determination section.

The camera (rear camera 45) is mounted on a vehicle (10) and obtains a heading direction image by photographing a region in a heading direction of said vehicle.

Said pedestrian position obtainment section executes a position obtainment process every time a predetermined time interval (time interval Ts) elapses so as to obtain a position correlation value (vertical position Dx and horizontal position Dy) representing a position of a pedestrian with respect to said vehicle on the basis of a position (image vertical position Px and image horizontal position Py) of said pedestrian in said heading direction image (step 825 of FIG. 8).

Said position processing section operates every time said position correlation value is obtained so as to determine a position processed value (processed vertical position Dpx and processed horizontal position Dpy) on the basis of said obtained position correlation value (step 830 of FIG. 8 and FIG. 9).

Said collision determination section determines, at a first time point when said position processed value is newly determined, whether or not a possibility of collision of said vehicle with said pedestrian is high, on the basis of said newly determined position processed value (step 855 of FIG. 8).

When said position correlation value obtained at said first time point is larger than a first specific value obtained by adding a predetermined first limit value (first vertical limit value Dxth1 and first horizontal limit value Dyth1) to said position processed value (previous vertical position Dox and previous horizontal position Doy) at a second time point which precedes said first time point by said interval time, said position processing section determines said position processed value at said first time point to be equal to said first specific value (steps 915 and 940 of FIG. 9).

When said position correlation value obtained at said first time point is smaller than a second specific value obtained by subtracting a predetermined second limit value (second vertical limit value Dxth2 and second horizontal limit value Dyth2) from said position processed value at said second time point, said position processing section determines said position processed value at said first time point to be equal to said second specific value (steps 925 and 950 of FIG. 9).

When said position correlation value obtained at said first time point is equal to or smaller than said first specific value and is equal to or larger than said second specific value, said position processing section determines said position processed value at said first time point to be equal to said position correlation value obtained at said first time point (steps 930 and 955 of FIG. 9).

In general, the moving speed (walking speed) of the pedestrian is relatively low. Therefore, the magnitude of a "position difference value which is a value obtained by subtracting the position correlation value at the first time point from the position processed value at the second time point" does not become excessively large. Meanwhile, as described above, when the foot position extraction error becomes large temporarily, the magnitude of the position difference value becomes large. In view of this, when the magnitude of the position difference value becomes larger than the first limit value or the second limit value, the apparatus of the present invention determines that a temporary increase in the foot position extraction error has occurred.

In such a case, the above-mentioned position processing section determines the position processed value to be equal to the first specific value or the second specific value, and the above-mentioned collision determination section determines, on the basis of the position processed value, whether or not the possibility of collision of the vehicle with the pedestrian is high. Therefore, in the case of the apparatus of the present invention, even when the error in extraction of the contour of the pedestrian contained in the heading direction image captured by the camera becomes large temporarily, the position of the pedestrian recognized by the apparatus of the present invention is prevented from greatly deviating from the actual position of the pedestrian. Therefore, the apparatus of the present invention can accurately determine whether or not the possibility of collision of the vehicle with the pedestrian is high even when the error in extraction of the contour of the pedestrian contained in the image captured by the single camera increases temporarily.

The above-mentioned collision determination section may determine that the possibility of collision of the vehicle with the pedestrian is high if the magnitude of an acceleration (necessary acceleration) required for the vehicle to stop before a position corresponding to the position processed value (i.e., the estimated position of the pedestrian with respect to the vehicle) is larger than a predetermined value. Alternatively, the collision determination section may determine that the possibility of collision of the vehicle with the pedestrian is high if the time (time to collision) until the vehicle collides with the pedestrian under the assumption that the travel speed of the vehicle is constant is shorter than a predetermined time. When the collision determination section determines that the possibility of collision of the vehicle with the pedestrian is high, the apparatus of the present invention may notify (warn) the driver of the vehicle that the possibility of collision with the pedestrian is high, or may cause a braking apparatus of the vehicle to generate a braking force to thereby stop the vehicle.

In one mode of the apparatus of the present invention, said position processing section changes at least one of said first limit value and said second limit value such that said at least one limit value increases with the magnitude of travel speed of said vehicle.

In the case where the moving speed of the pedestrian does not change, the position difference value increases with the travel speed of the vehicle. In the present mode, the first limit value and/or the second limit value is set to larger values in accordance with an increase in the position difference value due to an increase in the magnitude of the travel speed. Therefore, according to the present mode, the determination as to whether or not the possibility of collision of the vehicle with the pedestrian is high can be made accurately irrespective of the magnitude of the travel speed of the vehicle.

In another mode of the apparatus of the present invention, said camera is configured to obtain said heading direction image such that the longer the distance between said vehicle and an object present in said heading direction, the higher the position (image vertical position Px) of said object in said heading direction image; and said pedestrian position obtainment section is configured to obtain, as said position correlation value, a value (vertical position Dx) representing the distance between said vehicle and said pedestrian in said vehicle heading direction, and is configured to obtain said position correlation value such that the higher the position of a foot of said pedestrian in said heading direction image, the greater said distance represented by said position correlation value.

Since the apparatus of the present invention includes one camera, the apparatus cannot obtain the distance between the vehicle and the pedestrian on the basis of parallax as in the case of the conventional apparatus. However, according to the present mode, the position correlation value can be obtained by simple processing on the basis of one heading direction image captured by one camera.

In still another mode of the apparatus of the present invention, said collision determination section is configured to employ, as a necessary condition for determining that the possibility of collision of said vehicle with said pedestrian is high, a condition that said position processed value is a value representing a position within a path region (Ap) through which said vehicle is expected to pass as a result of traveling (condition (A) and step 840 of FIG. 8).

If the position of the pedestrian represented by the position processed value determined by the position processing section is contained in the path region, when the vehicle travels, the vehicle is likely to collide with the pedestrian. For example, the collision determination section can determine whether or not the possibility of collision is high by employing the above-described necessary acceleration or time to collision for that pedestrian. Therefore, according to the present mode, it is possible to accurately determine whether or not the possibility of collision of the vehicle with the pedestrian is high.

In still another mode of the apparatus of the present invention, said collision determination section is configured to estimate, on the basis of said position processed value, a predicted position (predicted vertical position Dfx and predicted horizontal position Dfy) which is the position of said pedestrian with respect to said vehicle after elapse of a predetermined prediction time (prediction time Tf), and to employ, as a necessary condition for determining that the possibility of collision of said vehicle with said pedestrian is high, a condition that said predicted position is a position within a path region (Ap) through which said vehicle is expected to pass as a result of traveling (condition (B) and step 840 of FIG. 8).

For example, it is possible to calculate a value (speed correlation value) which correlates with the moving speed of the pedestrian by dividing the position difference value by the above-mentioned time interval and obtain the predicted position on the basis of the speed correlation value. Even when a pedestrian is present outside the path region at the present point in time, after that, the pedestrian may enter the path region and the vehicle may collide with the pedestrian. According to the present mode, it is possible to accurately determine whether or not the possibility of collision of the vehicle with a "pedestrian present outside the path region at the present point in time" is high.

In the above description, in order to facilitate understanding of the present invention, the constituent elements of the invention corresponding to those of an embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DESCRIPTION OF THE PREFERRED EMBODIMENT

Figure 1:
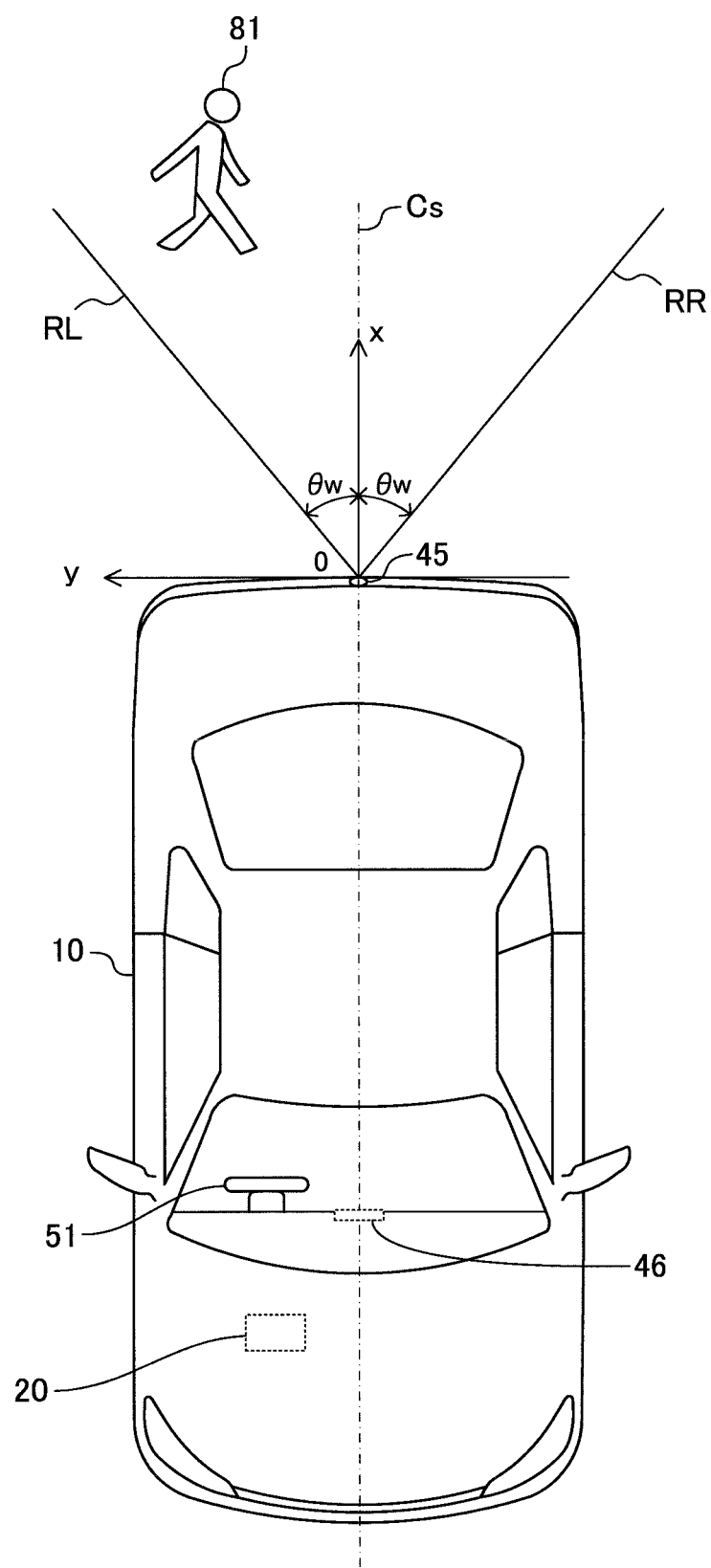
FIG. 1 is a schematic diagram of a vehicle (present vehicle) which includes a surrounding monitoring apparatus according to an embodiment of the present invention (present monitoring apparatus)

A surrounding monitoring apparatus according to an embodiment of the present invention (hereinafter also referred to as the "present monitoring apparatus") will be described with reference to the drawings. The present monitoring apparatus is applied to a vehicle 10 shown in FIG. 1. FIG. 2 shows a block diagram of the present monitoring apparatus. The present monitoring apparatus includes a "surrounding monitoring ECU 20, an engine ECU 31, and a brake ECU 32" each of which is an electric control unit (ECU).

The surrounding monitoring ECU 20 includes a CPU, a ROM, and a RAM. The CPU performs data reading, numerical computation, computation result output, etc. by repeatedly executing predetermined programs (routines). The ROM stores the programs executed by the CPU, lookup tables (maps), etc. The RAM stores data temporarily.

Like the surrounding monitoring ECU 20, each of the engine ECU 31 and the brake ECU 32 includes a CPU, a ROM, and a RAM. These ECUs can perform data communication (can exchange data) with one another through a CAN (controller area network) 34. In addition, through the CAN 34, each ECU can receive from "other ECUs" output values of sensors connected to the other ECUs.

The surrounding monitoring ECU 20 is connected to a shift position sensor 41, a vehicle speed sensor 42, an acceleration sensor 43, a steering angle sensor 44, a rear camera 45, an input output device 46, and speakers 47.

The shift position sensor 41 outputs to the surrounding monitoring ECU 20 a signal representing a travel mode (shift position) of the vehicle 10 selected by a driver's operation of a shift lever (not shown). Shift positions include a parking (P) range for parking, a drive (D) range for forward travelling, a reverse (R) range for backward travelling, a neutral (N) range for interrupting the transmission of torque from an engine 62 which is a drive source of the vehicle 10 to drive wheels (not shown), and a low (L) range which is higher in gear ratio Rg than the drive (D) range. The gear ratio Rg is the ratio of the rotational speed of the engine 62 to the rotational speed of the drive wheels.

The vehicle speed sensor 42 outputs to the surrounding monitoring ECU 20 a signal representing the magnitude of the speed Vs of the vehicle 10 (hereinafter referred to as the "vehicle speed Vs"). In the case where the shift position is a position other than the reverse (R) range, the vehicle speed Vs is represented by a positive value. Meanwhile, in the case where the shift position is the reverse (R) range, the vehicle speed Vs is represented by a negative value.

The acceleration sensor 43 outputs to the surrounding monitoring ECU 20 a signal representing the acceleration As of the vehicle 10 in the longitudinal direction (the amount of change in the vehicle speed Vs per unit time).

The steering angle sensor 44 is disposed on a steering shaft (not shown) connected to a steering wheel 51. The steering angle sensor 44 outputs to the surrounding monitoring ECU 20 a signal representing a steering angle θs which is the rotational angle of the steering shaft of the steering wheel 51. The steering angle θs becomes "0" when the steering wheel 51 is located at its neutral position. The steering angle θs assumes a positive value when the steering wheel 51 is rotated clockwise from the neutral position and assumes a negative value when the steering wheel 51 is rotated counterclockwise from the neutral position.

The rear camera 45 is disposed at a central portion of the rear end of the vehicle 10. The rear camera 45 captures an image of a region located rearward of the vehicle 10 (hereinafter also referred to as the "heading direction image" because the image is an image of a region which is located in the heading direction of the vehicle 10 when the vehicle 10 moves backward) and outputs a signal representing the heading direction image to the surrounding monitoring ECU 20.

Figure 2:
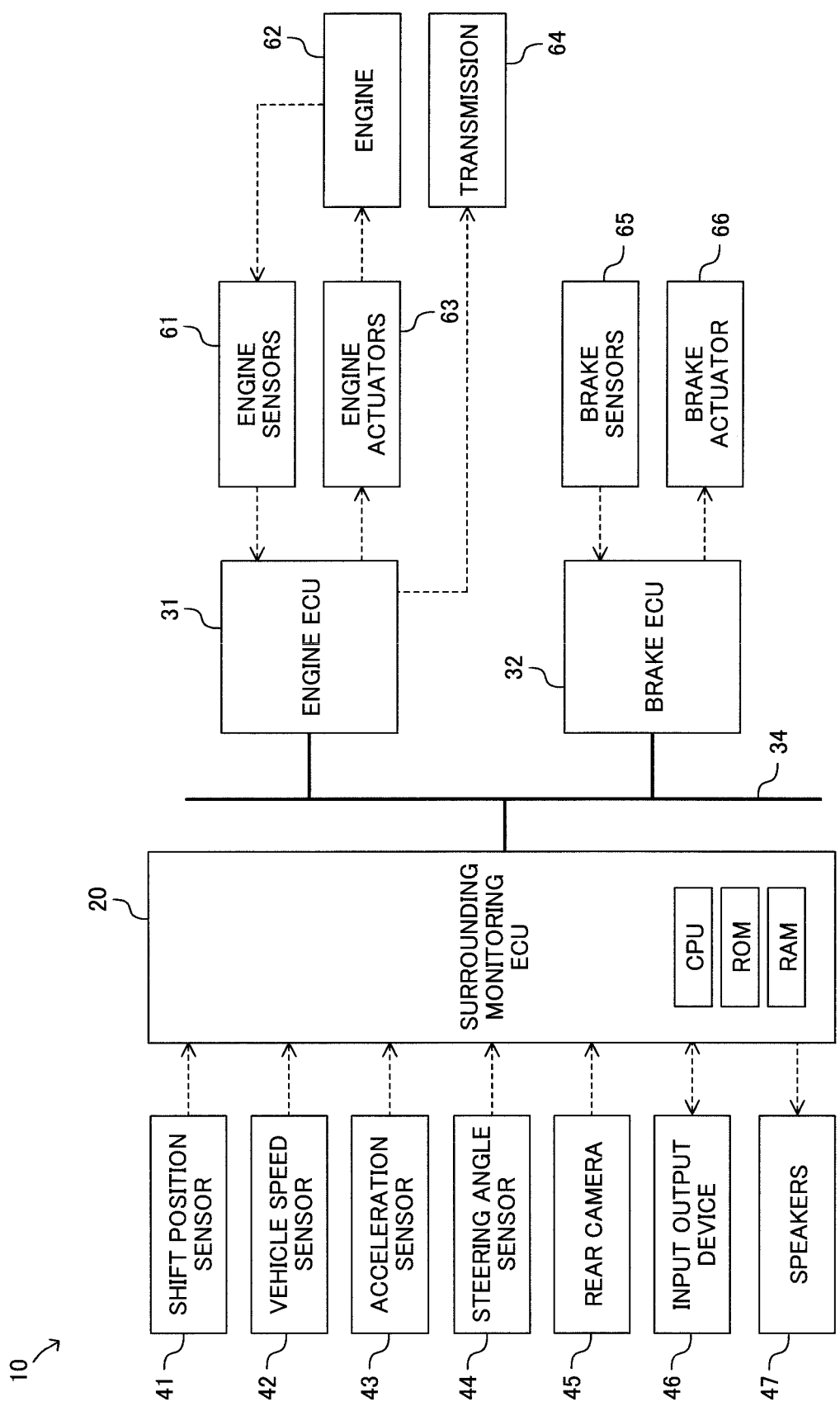
FIG. 2 is a block diagram of the present monitoring apparatus.

The angle of view (field of view) of the rear camera 45 in the horizontal direction is equal to a range represented by an angle (an angle less than 180°) formed between a straight line RL and a straight line RR shown in FIG. 1. The angle between the straight line RL and a center axis Cs which passes through the center of the vehicle 10 in the vehicle width direction thereof and extends in the straight forward direction of the vehicle 10 is θw. In addition, the angle between the straight line RR and the center axis Cs is θw. Accordingly, a subject which is located rearward of the vehicle 10 and located on the center axis Cs appears at the center of the heading direction image in the lateral direction.

Notably, as shown in FIG. 1, the longitudinal direction of the vehicle 10 (direction parallel to the center axis Cs) is defined as an x axis, and the lateral direction of the vehicle 10 (vehicle width direction) is defined as a y axis. The lateral center of the rear end of the vehicle 10 is the origin where x=0 and y=0. The x coordinate value assumes a positive value on the side of the origin toward the backward direction of the vehicle 10 and assumes a negative value on the side of the origin toward the forward direction of the vehicle 10. The y coordinate value assumes a positive value on the left side with respect to the heading direction of the vehicle 10 moving backward and assumes a negative value on the right side with respect to the heading direction of the vehicle 10 moving backward. In the present specification, the direction in which the vehicle 10 turns as a result of backward movement of the vehicle 10 in a state in which the steering angle θs is positive will be referred to as the "leftward direction." Meanwhile, the direction in which the vehicle 10 turns as a result of backward movement of the vehicle 10 in a state in which the steering angle θs is negative will be referred to as the "rightward direction."

The input output device 46 is disposed on the dashboard of the vehicle 10. The input output device 46 includes a display unit (liquid crystal display). Characters, figures, etc. displayed on the display unit of the input output device 46 are controlled by the surrounding monitoring ECU 20. The display unit of the input output device 46 also functions as a touch panel. Accordingly, a driver can send instructions to the surrounding monitoring ECU 20 by touching the display unit.

The speakers 47 are respectively disposed inside the left and right front doors (not shown) of the vehicle 10 (within the vehicle compartment). The speakers 47 can produce sounds such as a warning sound and a voice message in accordance with instructions from the surrounding monitoring ECU 20.

The engine ECU 31 is connected to a plurality of engine sensors 61 and receives detection signals from these sensors. The engine sensors 61 detect the operation state quantities of the engine 62. The engine sensors 61 include an accelerator pedal operation amount sensor, a throttle valve opening sensor, an engine speed sensor, an intake air amount sensor, etc.

Further, the engine ECU 31 is connected to engine actuators 63, such as a throttle valve actuator and a fuel injection valve, and a transmission 64. The engine ECU 31 changes the drive torque Tq generated by the engine 62 and the gear ratio Rg of the transmission 64 by controlling the engine actuators 63 and the transmission 64. Thus, the engine ECU 31 adjusts the drive force of the vehicle 10, to thereby control the acceleration As. Meanwhile, the surrounding monitoring ECU 20 drives the engine actuators 63 and the transmission 64 by sending instructions to the engine ECU 31, to thereby change the driving force of the vehicle 10.

The brake ECU 32 is connected to a plurality of brake sensors 65 and receives detection signals from these sensors. The brake sensors 65 detect parameters used for controlling an unillustrated "brake (hydraulic frictional brake) mounted on the vehicle 10." The brake sensors 65 include an operation amount sensor for detecting the operation amount of a brake pedal (not shown), wheel speed sensors for detecting the rotational speeds of the wheels, etc.

Further, the brake ECU 32 is connected to a brake actuator 66. The brake actuator 66 is a hydraulic control actuator. The brake actuator 66 is provided in a hydraulic circuit extending between a master cylinder which pressurizes hydraulic oil by using the depressing force applied to the brake pedal and the friction brake including well-known wheel cylinders provided in the wheels. The hydraulic circuit, the master cylinder, and the friction brake are not shown in the drawings. The brake actuator 66 controls the oil pressure supplied to the wheel cylinders. The brake ECU 32 generates a brake force (frictional brake force) Bf applied to the wheels, by driving the brake actuator 66, so as to control the acceleration As of the vehicle 10 (specifically, decrease the magnitude |Vs| of the vehicle speed Vs). Meanwhile, the surrounding monitoring ECU 20 drives the brake actuator 66 by sending an instruction to the brake ECU 32, to thereby change the braking force Bf.

Collision Avoidance Control

In the case where the vehicle 10 moves backward, if the possibility of collision with a pedestrian present in the backward direction of the vehicle 10 is high, the surrounding monitoring ECU 20 executes collision avoidance control for notifying (warning) the driver of the vehicle 10 of the possibility of collision and causing the brake actuator 66 to generate the braking force Bf, to thereby stop the vehicle 10.

In order to determine whether or not the possibility of collision of the vehicle 10 with the pedestrian is high, the surrounding monitoring ECU 20 obtains "the vertical position Dx which is the x coordinate value" and "the horizontal position Dy which is the y coordinate value" of the pedestrian contained in the heading direction image, every time a predetermined time interval Ts (fixed value) elapses. Specifically, the surrounding monitoring ECU 20 executes a "position obtainment process" of estimating the vertical position Dx and the horizontal position Dy on the basis of the position of the pedestrian in the heading direction image. For convenience sake, the vertical position Dx and the horizontal position Dy will also be referred as a "position correlation value."

At the time of execution of the position obtainment process, the surrounding monitoring ECU 20 searches a "portion of the heading direction image, which portion is similar to any of many pedestrian templates (pedestrian patterns) stored in advance." If a portion of the heading direction image which is similar to one of the pedestrian templates (namely, a pedestrian in the heading direction image) is found, the surrounding monitoring ECU 20 extracts the contour of "the pedestrian in the heading direction image" which corresponds to that pedestrian template. Namely, the surrounding monitoring ECU 20 extracts the contour of the pedestrian contained in the heading direction image by means of pattern matching.

Figure 3:
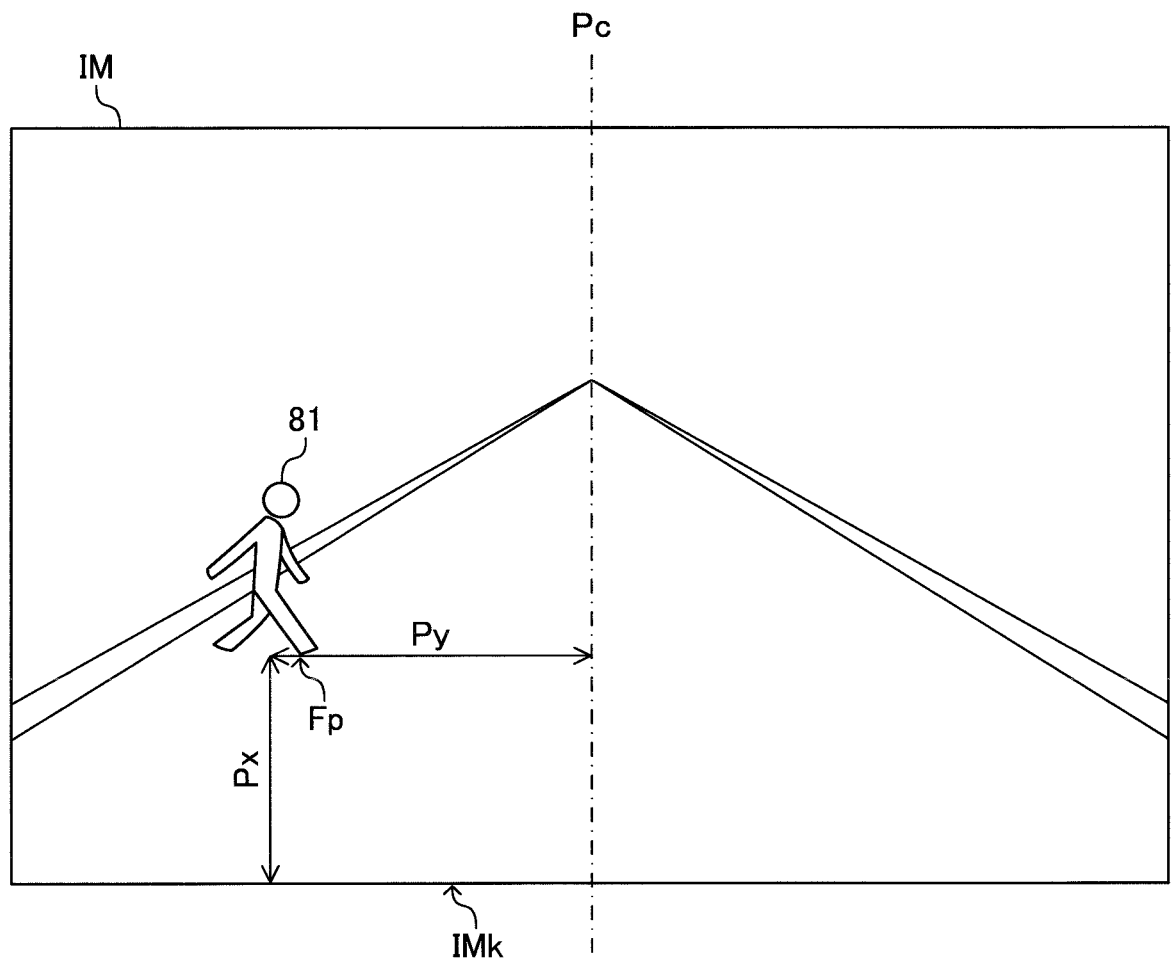
FIG. 3 is an illustration showing an example of a pedestrian appearing on a heading direction image.

After extraction of the contour of the pedestrian contained in the heading direction image, the surrounding monitoring ECU 20 obtains an image vertical position Px and an image horizontal position Py which represent the foot position of the pedestrian in the heading direction image. FIG. 3 shows a heading direction image IM from which the contour of a pedestrian 81 (which is also shown in FIG. 1) has been extracted. As shown in FIG. 3, the image vertical position Px is the length in the vertical direction between the lower end IMk of the heading direction image IM and a position corresponding to the lower end Fp of the pedestrian 81 in the heading direction image. Meanwhile, the magnitude |Py| of the image horizontal position Py is the length in the lateral direction between the lateral center of the pedestrian 81 in the heading direction image and a center line Pc which is the lateral center of the heading direction image.

The value of the image vertical position Px is "0" when the lower end of the pedestrian is located at the lower end of the heading direction image and the value changes such that the higher the lower end of the pedestrian in the heading direction image, the greater the value of the image vertical position Px. Meanwhile, the value of the image horizontal position Py is "0" when the lateral center of the pedestrian is located on the center line Pc. When the lateral center of the pedestrian is located on the left side of the center line Pc, the image horizontal position Py assumes a positive value, and the value of the image horizontal position Py changes such that the greater the leftward separation of the lateral center of the pedestrian from the center line Pc, the greater the value of the image horizontal position Py. In addition, when the lateral center of the pedestrian is located on the right side of the center line Pc, the image horizontal position Py assumes a negative value, and the magnitude |Py| of the image horizontal position Py changes such that the greater the rightward separation of the lateral center of the pedestrian from the center line Pc, the greater the magnitude |Py|.

The surrounding monitoring ECU 20 obtains (estimates) the vertical position Dx and the horizontal position Dy from the image vertical position Px and the image horizontal position Py. More specifically, the greater the actual vertical position Dx, the greater the image vertical position Px. In addition, the greater the magnitude |Dy| of the actual horizontal position Dy, the greater the magnitude |Py| of the image horizontal position Py. Furthermore, when the magnitude |Dy| of the horizontal position Dy is constant, the greater the vertical position Dx, the smaller the magnitude |Py| of the image horizontal position Py.

In view of this, the surrounding monitoring ECU 20 obtains the vertical position Dx by applying the image vertical position Px to a "lookup table which defines the relation between the image vertical position Px and the vertical position Dx" which is stored in advance. In addition, the surrounding monitoring ECU 20 obtains the horizontal position Dy by applying the image vertical position Px and the image horizontal position Py to a "lookup table which defines the relation between the "image vertical position Px and the image horizontal position Py" and the horizontal position Dy" which is stored in advance.

Incidentally, if the error in extraction of the contour of the pedestrian appearing in the heading direction image is large, the error contained in the combination of the image vertical position Px and the image horizontal position Py becomes large, so that the error contained in the combination of the vertical position Dx and the horizontal position Dy becomes large.

For example, in the case where a puddle is present on a walking path of the pedestrian and therefore, adjacent to an image of a foot of the pedestrian, an image of the "foot reflected in the puddle" appears in the heading direction image, the error in the extraction of the contour of the pedestrian may become large temporarily. Also, in the case where a road sign on the walking path of the pedestrian and the shoes of the pedestrian resemble each other in color, the error in the extraction of the contour of the pedestrian may become large temporarily.

In view of this, the surrounding monitoring ECU 20 executes a "position correction process" so as to accurately determine whether or not the possibility of collision of the vehicle 10 with the pedestrian is high even when the error in the extraction of the contour of the pedestrian may become large temporarily. The surrounding monitoring ECU 20 obtains the processed vertical position Dpx and the processed horizontal position Dpy by the position correction process. By a process to be described later, the surrounding monitoring ECU 20 accurately determines whether or not the possibility of collision of the vehicle 10 with the pedestrian is high on the basis of the processed vertical position Dpx and the processed horizontal position Dpy. For convenience sake, each of the processed vertical position Dpx and the processed horizontal position Dpy will also be referred to as a "position processed value."

The position correction process will be described. In the following description, the difference between the vertical position Dx obtained by the position obtainment process executed latest and a previous vertical position Dox which is the processed vertical position Dpx obtained when the position obtainment process and the position correction process were executed last time will also be referred to as a vertical position difference ΔDx (i.e., ΔDx=Dx−Dox). Meanwhile, the difference between the horizontal position Dy obtained by the position obtainment process executed latest and a previous horizontal position Doy which is the processed horizontal position Dpy obtained when the position obtainment process and the position correction process were executed last time will also be referred to as a horizontal position difference ΔDy (i.e., ΔDy=Dy−Doy).

In general, since the moving speed (walking speed) of the pedestrian is relatively low, the magnitude of the vertical position difference ΔDx normally does not assume a large value. In view of this, when the surrounding monitoring ECU 20 executes the position correction process, if the vertical position difference ΔDx is larger than a predetermined first vertical limit value Dxth1 (i.e., ΔDx>Dxth1>0), the surrounding monitoring ECU 20 determines the processed vertical position Dpx to be equal to a value obtained by adding the first vertical limit value Dxth1 to the previous vertical position Dox (i.e., Dpx←Dox+Dxth1). For convenience sake, the value obtained by adding the first vertical limit value Dxth1 to the previous vertical position Dox will also be referred to as a "first specific value."

If the vertical position difference ΔDx is smaller than a value (−Dxth2) obtained by multiplying a predetermined second vertical limit value Dxth2 by "−1" (i.e., ΔDx<−Dxth2<0), the surrounding monitoring ECU 20 determines the processed vertical position Dpx to be equal to a value obtained by subtracting the second vertical limit value Dxth2 from the previous vertical position Dox (i.e., Dpx←Dox−Dxth2). For convenience sake, the value obtained by subtracting the second vertical limit value Dxth2 from the previous vertical position Dox will also be referred to as a "second specific value."

If the vertical position difference ΔDx is equal to or smaller than the first vertical limit value Dxth1 and is equal to or larger than the value obtained by multiplying the second vertical limit value Dxth2 by "−1" (i.e., −Dxth2≤ΔDx≤Dxth1), the surrounding monitoring ECU 20 determines the processed vertical position Dpx to be equal to the vertical position Dx (i.e., Dpx←Dx).

Namely, if the magnitude of the vertical position difference ΔDx is large, the surrounding monitoring ECU 20 determines that the error of the vertical position Dx has increased temporarily and uses the corrected value as the processed vertical position Dpx. Meanwhile, if the magnitude of the vertical position difference ΔDx is small, the surrounding monitoring ECU 20 determines that the error of the vertical position Dx is small and uses the vertical position Dx as the processed vertical position Dpx.

Similarly, when the surrounding monitoring ECU 20 executes the position correction process, if the horizontal position difference ΔDy is greater than a predetermined first horizontal limit value Dyth1 (i.e., ΔDy>Dyth1>0), the surrounding monitoring ECU 20 determines the processed horizontal position Dpy to be equal to a value obtained by adding the first horizontal limit value Dyth1 to the previous horizontal position Doy (i.e., Dpy←Doy+Dyth1). For convenience, the value obtained by adding the first horizontal limit value Dyth1 to the previous horizontal position Doy will also be referred to as a "first specific value."

If the horizontal position difference ΔDy is smaller than a value (−Dyth2) obtained by multiplying a predetermined second horizontal limit value Dyth2 by "−1" (i.e., ΔDy<−Dyth2<0), the surrounding monitoring ECU 20 determines the processed horizontal position Dpy to be equal to a value obtained by subtracting the second horizontal limit value Dyth2 from the previous horizontal position Doy (i.e., Dpy←Doy−Dyth2). For convenience sake, the value obtained by subtracting the second horizontal limit value Dyth2 from the previous horizontal position Doy will also be referred to as a "second specific value."

If the horizontal position difference ΔDy is equal to or smaller than the first horizontal limit value Dyth1 and equal to or larger than the value obtained by multiplying the second horizontal limit value Dyth2 by "−1" (i.e., −Dyth2≤ΔDy≤Dyth1), the surrounding monitoring ECU 20 determines the processed horizontal position Dpy to be equal to the horizontal position Dy (i.e., Dpy←Dy).

In the present embodiment, all the first vertical limit value Dxth1, the second vertical limit value Dxth2, the first horizontal limit value Dyth1, and the second horizontal limit value Dyth2 are equal to a distance threshold Dth. Notably, some of or all the first vertical limit value Dxth1, the second vertical limit value Dxth2, the first horizontal limit value Dyth1, and the second horizontal limit value Dyth2 may differ from one another.

Figure 4:
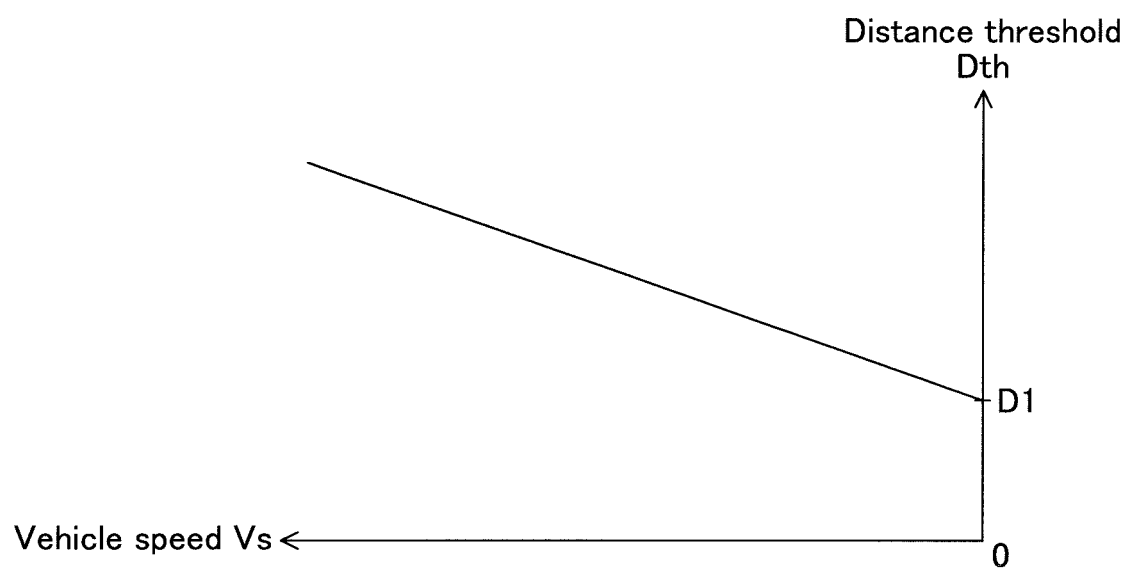
FIG. 4 is a graph showing the relation between speed of the present vehicle and distance threshold.

Incidentally, if the moving speed of the pedestrian does not change, as the magnitude |Vs| of the vehicle speed Vs increases, the magnitude |ΔDx| of the vertical position difference ΔDx and the magnitude |ΔDy| of the horizontal position difference ΔDy increase. In view of this, the surrounding monitoring ECU 20 sets the distance threshold Dth (i.e., the first vertical limit value Dxth1, the second vertical limit value Dxth2, the first horizontal limit value Dyth1, and the second horizontal limit value Dyth2) such that the larger the magnitude |Vs| of the vehicle speed Vs, the larger the distance threshold Dth. FIG. 4 shows the relation between the vehicle speed Vs and the distance threshold Dth. As can be understood from FIG. 4, when the vehicle speed Vs is "0," the distance threshold Dth is a distance D1. As the vehicle speed Vs decreases in the range smaller than "0," the distance threshold Dth increases.

Figure 5:
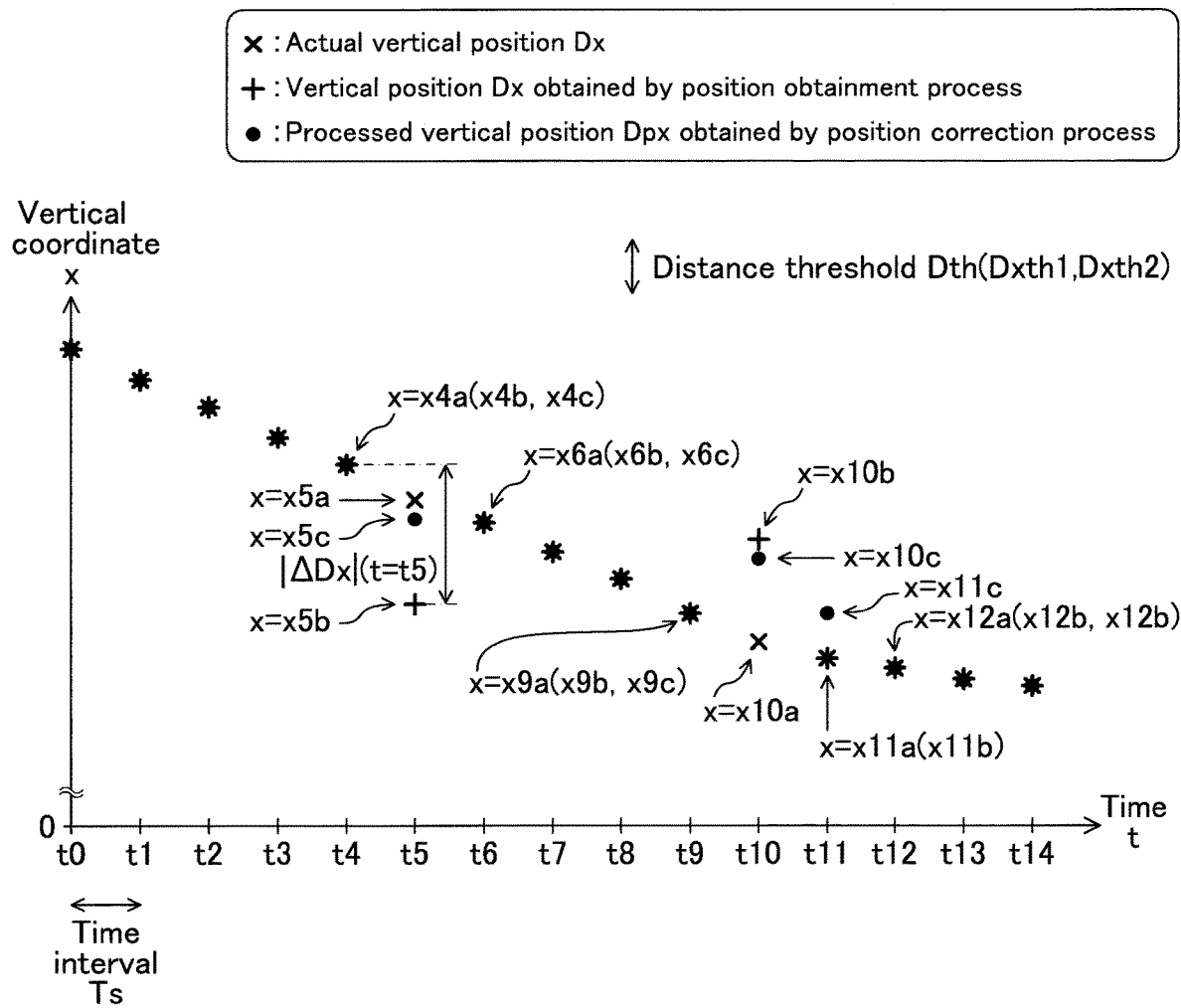
FIG. 5 is a graph showing the actual vertical position of a pedestrian which changes with elapse of time, the vertical position obtained by a position obtainment process, and the processed vertical position obtained by a position correction process.

The above-mentioned position correction process will be described more specifically with reference to FIG. 5. FIG. 5 shows examples of changes in the actual x coordinate value of the pedestrian position, the vertical position Dx obtained by the position obtainment process, and the processed vertical position Dpx obtained by the position correction process with elapse of time t, wherein the changes were determined at time intervals Ts from time t0 to t12. In the example of FIG. 5, the x coordinate value of the pedestrian decreases with elapse of time. Notably, since the position correction process for the horizontal position Dy is the same as the position correction process for the vertical position Dx, description for the horizontal position Dy with reference to a chart similar to the chart of FIG. 5 is omitted.

At time t4 of FIG. 5, the actual x coordinate value of the pedestrian is x4a. The vertical position Dx obtained by the position obtainment process at time t4 is x4b approximately equal to x4a (i.e., Dx=x4b≅x4a). In addition, the processed vertical position Dpx obtained by the position correction process at time t4 is x4c equal to the vertical position Dx (=x4b) (i.e., Dpx=x4c=x4b).

At time t5 after elapse of the time interval Ts from time t4, the actual x coordinate value of the pedestrian is x5a. Meanwhile, since the contour extraction error in the position obtainment process executed at time t5 was large, the vertical position Dx is x5b which is smaller than the actual x coordinate value x5a (i.e., Dx=x5b<x5a). As a result, the vertical position difference ΔDx at time t5 is smaller than the value obtained by multiplexing the second vertical limit value Dxth2 by "−1" (i.e., ΔDx=x5b−x4c<−Dxth2). Therefore, the processed vertical position Dpx obtained by the position correction process at time t5 becomes x5c which is a value obtained by subtracting the second vertical limit value Dxth2 from the previous vertical position Dox (in this case, x4c which is the processed vertical position Dpx at time t4) (i.e., Dpx=x5c=x4c−Dxth2).

At time t6 after elapse of the time interval Ts from time t5, the actual x coordinate value of the pedestrian is x6a. Meanwhile, the vertical position Dx obtained by the position obtainment process at time t6 is x6b approximately equal to x6a (i.e., Dx=x6b≅x6a). The vertical position difference ΔDx at time t6 (=x6b−x5c) is equal to or smaller than the first vertical limit value Dxth1 and the vertical position difference ΔDx is equal to or larger than the value (−Dyth2) obtained by multiplexing the second horizontal limit value Dyth2 by "−1" (i.e., −Dyth2≤ΔDx≤Dyth1). Therefore, the processed vertical position Dpx obtained by the position correction process at time t6 is x6c equal to the vertical position Dx (=x6b) (i.e., Dpx=x6c=x6b).

At time t9, the actual x coordinate value of the pedestrian is x9a, the vertical position Dx is x9b approximately equal to x9a (i.e., Dx=x9b≅x9a), and the processed vertical position Dpx is x9c equal to the vertical position Dx (=x9b) (i.e., Dpx=x9c=x9b).

At time t10 after elapse of the time interval Ts from time t9, the actual x coordinate value of the pedestrian is x10a. Meanwhile, since the contour extraction error in the position obtainment process executed at time t10 was large, the vertical position Dx is x10b which is larger than the actual x coordinate value x10a (i.e., Dx=x10b>x10a). As a result, the vertical position difference ΔDx at time t10 is larger than the first vertical limit value Dxth1 (i.e., ΔDx=x10b−x9c>Dxth1). Therefore, the processed vertical position Dpx obtained by the position correction process becomes x10c which is a value obtained by adding the first vertical limit value Dxth1 to the previous vertical position Dox (in this case, x9c which is the processed vertical position Dpx at time t9) (i.e., Dpx=x10c=x9c+Dxth1).

At time t11 after elapse of the time interval Ts from time t10, the actual x coordinate value of the pedestrian is x11a.

The vertical position Dx obtained by the position obtainment process at time t11 is x11*b* approximately equal to x11*a* (i.e., Dx=x11*b*≅x11*a*). The vertical position difference ΔDx at time t11 is smaller than the value (−Dyth2) obtained by multiplexing the second horizontal limit value Dyth2 by "−1" (i.e., ΔDx=x11*b*−x10*c*<−Dxth2). Therefore, the processed vertical position Dpx obtained by the position correction process at time t11 is x11*c* which is a value obtained by subtracting the second vertical limit value Dxth2 from the previous vertical position Dox (in this case, x10*c* which is the processed vertical position Dpx at time t10) (i.e., Dpx=x11*c*=x10*c*−Dxth2).

At time t12 after elapse of the time interval Ts from time t11, the actual x coordinate value of the pedestrian is x12*a*. Meanwhile, the vertical position Dx obtained by the position obtainment process at time t12 is x12*b* approximately equal to x12*a* (i.e., Dx=x12*b*≅x12*a*). The vertical position difference ΔDx at time t12 (=x12*b*−x11*c*) is equal to or smaller than the first horizontal limit value Dyth1 and the vertical position difference ΔDx is equal to or larger than the value (−Dyth2) obtained by multiplexing the second horizontal limit value Dyth2 by "−1" (i.e., −Dyth2≤ΔDx≤Dyth1). Therefore, the processed vertical position Dpx obtained by the position correction process at time t12 is x12*c* equal to the vertical position Dx (=x12*b*) (i.e., Dpx=x12*c*=x12*b*).

After having obtained the processed vertical position Dpx and the processed horizontal position Dpy corresponding to the pedestrian contained in the heading direction image by the position obtainment process and the position correction process, the surrounding monitoring ECU 20 determines whether or not that pedestrian is a "pedestrian on path." The pedestrian on path is a pedestrian who is highly likely to collide with the vehicle 10 when the vehicle 10 moves backward.

The surrounding monitoring ECU 20 determines that the pedestrian is a "pedestrian on path" when either one or both of the following conditions (A) and (B) are satisfied.
(A) The pedestrian is present in a path region Ap at the present point in time.
(B) The pedestrian is present in the path region Ap after elapse of a predetermined prediction time Tf (2 seconds in the present embodiment) from the present point in time.

Figure 6:
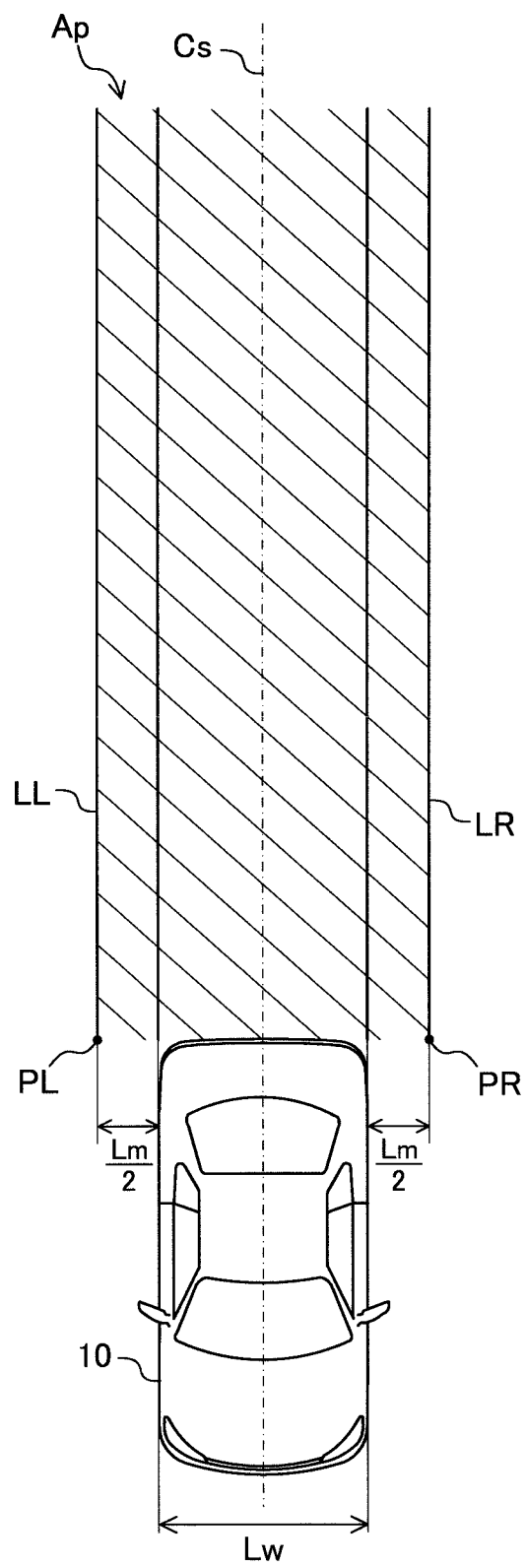
FIG. 6 is an illustration showing a path region for the case where the present vehicle moves straight backward.

FIG. 6 shows the path region Ap when the steering angle θs is "0." As shown in FIG. 6, the path region Ap extends rearward from the vehicle 10, has a center coinciding with the center axis Cs, and has a width which is equal to the sum of the width Lw of the vehicle 10 and a vehicle width margin Lm. Namely, the path region Ap is a region between a straight line LL and a straight line LR. The straight line LL passes through a point PL offset leftward from the position of the left side surface of a rear end portion of the vehicle 10 by a half (Lm/2) of the vehicle width margin Lm and extends backward from the rear end of the vehicle 10 parallel to the center axis Cs. The straight line LR passes through a point PR offset rightward from the position of the right side surface of the rear end portion of the vehicle 10 by a half (Lm/2) of the vehicle width margin Lm and extends backward from the rear end of the vehicle 10 parallel to the center axis Cs.

Figure 7:
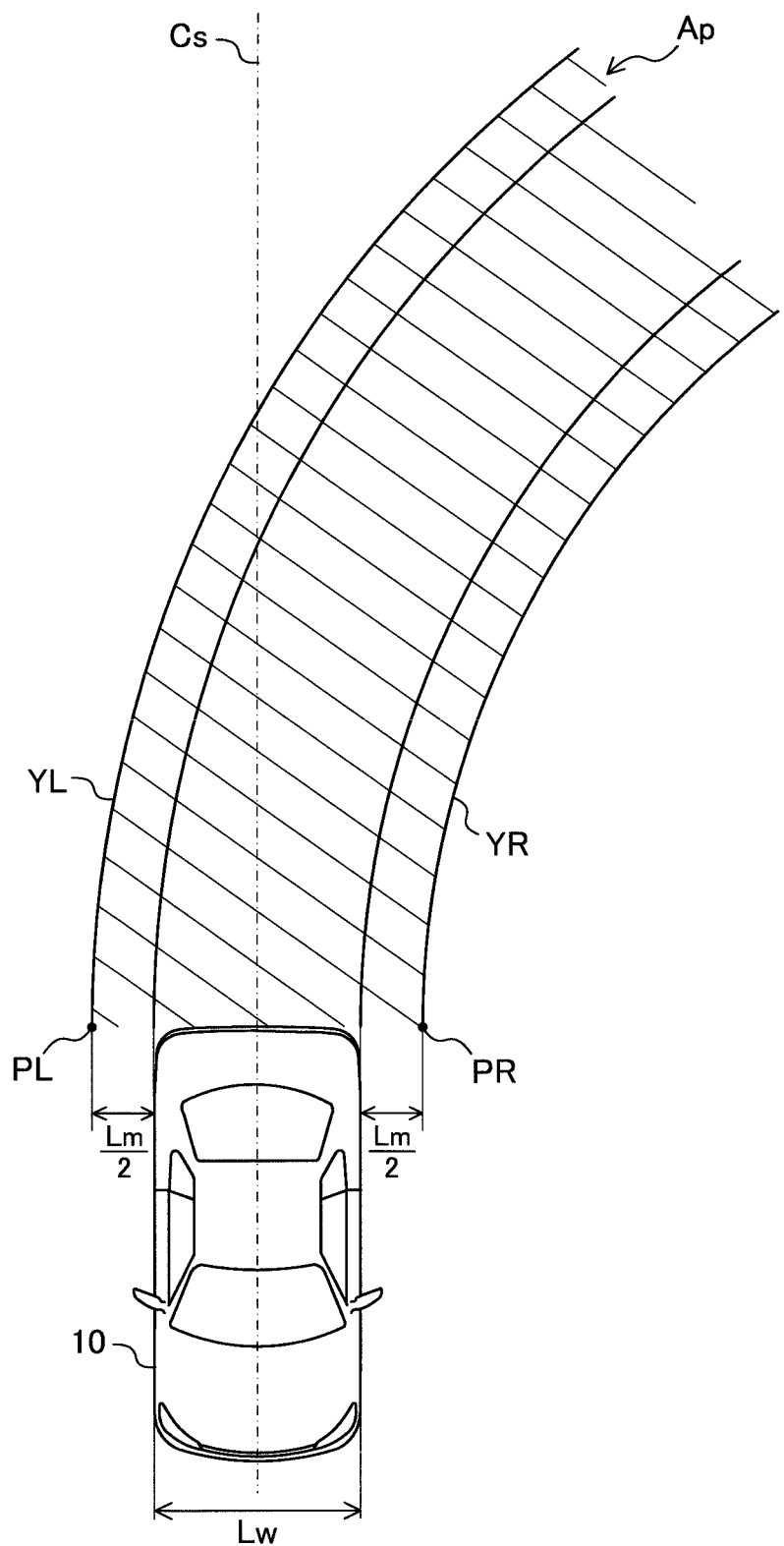
FIG. 7 is an illustration showing a path region for the case where the present vehicle moves backward while turning.

Meanwhile, when the steering angle θs is not "0," the path region Ap curves leftward or rightward in accordance with the steering angle θs. Specifically, when the steering angle θs is negative, as shown in FIG. 7, as the degree of separation from the vehicle 10 increases, the rightward deviation of the lateral center of the path region Ap from the center axis Cs increases (namely, as the x coordinate value increases, the y coordinate value of the right end of the path region Ap decreases). In the case, the path region Ap is a region between a left side arc YL passing through the point PL and a right side arc YR passing through the point PR. Meanwhile, when the steering angle θs is positive, the path region Ap is defined in such a manner that, as the degree of separation from the vehicle 10 increases, the leftward deviation of the lateral center of the path region Ap from the center axis Cs increases (namely, as the x coordinate value increases, the y coordinate value of the left end of the path region Ap increases).

When the position represented by the processed vertical position Dpx and the processed horizontal position Dpy is contained in the path region Ap, the surrounding monitoring ECU 20 determines that the above-described condition (A) is satisfied. Further, in order to determine whether or not the above-described condition (B) is satisfied, the surrounding monitoring ECU 20 obtains a predicted vertical position Dfx which is a predicted value of the x coordinate value of the pedestrian at the time after elapse of the prediction time Tf from the present point in time. In addition, the surrounding monitoring ECU 20 obtains a predicted horizontal position Dfy which is a predicted value of the y coordinate value of the pedestrian at the time after elapse of the prediction time Tf from the present point in time. If the position represented by the predicted vertical position Dfx and the predicted horizontal position Dfy is contained in the path region Ap, the surrounding monitoring ECU 20 determines that the above-described condition (B) is satisfied.

For convenience sake, the process executed by the surrounding monitoring ECU 20 so as to obtain the predicted vertical position Dfx and the predicted horizontal position Dfy will also be referred to as a "position prediction process." At the time of execution of the position prediction process, the surrounding monitoring ECU 20 obtains a vertical velocity Vx which is the velocity component of the pedestrian in the vertical direction (the x-axis direction) and a horizontal velocity Vy which is the velocity component of the pedestrian in the horizontal direction (the y-axis direction).

Specifically, the surrounding monitoring ECU 20 calculates the vertical velocity Vx by dividing the vertical position difference ΔDx by the time interval Ts (i.e., Vx=ΔDx/Ts). Similarly, the surrounding monitoring ECU 20 calculates the horizontal velocity Vy by dividing the horizontal position difference ΔDy by the time interval Ts (i.e., Vy=ΔDy/Ts).

The surrounding monitoring ECU 20 calculates the predicted vertical position Dfx by adding to the processed vertical position Dpx a "value obtained by multiplying the "vertical velocity Vx by the prediction time Tf" (i.e., Dfx←Dpx+Vx×Tf). Similarly, the surrounding monitoring ECU 20 calculates the predicted horizontal position Dfy by adding to the processed horizontal position Dpy a "value obtained by multiplying the "horizontal velocity Vy by the prediction time Tf" (i.e., Dfy←Dpy+Vy×Tf).

If a pedestrian on path is present (namely, the above-described condition (A) and/or condition (B) is satisfied), the surrounding monitoring ECU 20 calculates a required deceleration Dcreq which is an acceleration As required for the vehicle 10 to stop before the pedestrian on path. Since the required deceleration Dcreq is an acceleration As determined such that when the vehicle 10 is moving backward (namely, when Vs<0), the magnitude |Vs| of the vehicle speed Vs decreases, the required deceleration Dcreq assumes a positive value (i.e., Dcreq>0).

Specifically, the surrounding monitoring ECU 20 calculates the required deceleration Dcreq in accordance with the following Equation (1) as the acceleration As required to stop the vehicle 10 after the vehicle 10 travels over a travel distance Dd.

$$Dcreq=(1/2) \cdot Vs^2/Dd \quad (1)$$

The surrounding monitoring ECU 20 calculates the difference between a predetermined length (stop position margin) Lv and a travel distance (journey) Dw of the vehicle 10 before collision with the pedestrian on path for the case where the steering angle θs is assumed to be constant, and calculates the required deceleration Dcreq by substituting the difference into Equation (1) as the travel distance Dd (i.e., Dd=Dw−Lv). If the required deceleration Dcreq is greater than a predetermined acceleration threshold Ath (i.e., Dcreq>Ath), the surrounding monitoring ECU 20 determines that the possibility of collision of the vehicle 10 with the pedestrian on path is high.

When the surrounding monitoring ECU 20 determines that the possibility of collision of the vehicle 10 with the pedestrian on path is high, the surrounding monitoring ECU 20 notifies (warns) the driver of the vehicle 10, through the input output device 46 and the speakers 47, the fact that the possibility of collision with the pedestrian on path is high. In addition, the surrounding monitoring ECU 20 executes an "automatic braking process" of sending request signals to the engine ECU 31 and the brake ECU 32 such that the actual acceleration As becomes equal to the required deceleration Dcreq.

Specifically, the surrounding monitoring ECU 20 sends a request signal to the brake ECU 32 so as to request the brake ECU 32 to generate a braking force Bf for making the actual acceleration As equal to the required deceleration Dcreq. In addition, the surrounding monitoring ECU 20 sends a request signal to the engine ECU 31 so as to request the engine ECU 31 to decrease the drive torque Tq to "0." As a result, the magnitude |Vs| of the vehicle speed Vs decreases and finally becomes "0."

Specific Operation

Next, specific operation of the surrounding monitoring ECU 20 will be described. The CPU of the surrounding monitoring ECU 20 (hereinafter may be referred to as the "CPU" for simplification) executes a "collision avoidance control routine" represented by a flowchart in FIG. 8 every time the time interval Ts elapses.

Figure 8:
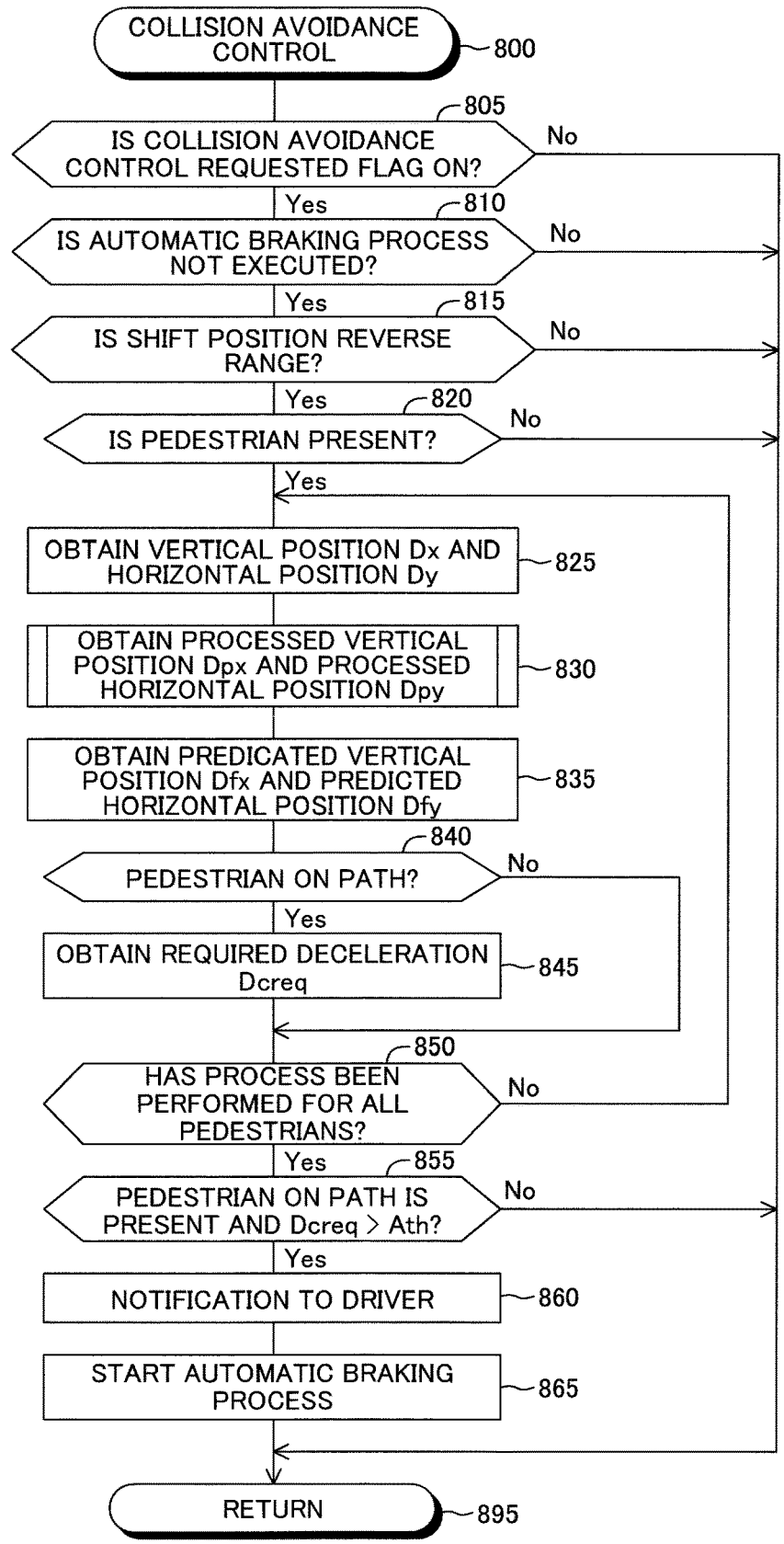
FIG. 8 is a flowchart representing a collision avoidance control routine executed by the present monitoring apparatus.

Accordingly, when a proper timing has come, the CPU starts the process from step 800 of FIG. 8 and proceeds to step 805 so as to determine whether or not a collision avoidance control requested flag is in an ON state. In the case where the collision avoidance control requested flag has been set to an OFF state as a result of a driver's operation of the input output device 46, the CPU makes a "No" determination in step 805 and proceeds directly to step 895 so as to end the current execution of the present routine.

Meanwhile, in the case where the collision avoidance control requested flag is in the ON state, the CPU makes a "Yes" determination in step 805 and proceeds to step 810 so as to determine whether or not the automatic braking process has already been started. In the case where the automatic braking process has not yet been started, the CPU makes a "Yes" determination in step 810 and proceeds to step 815 so as to determine whether or not the shift position detected by the shift position sensor 41 is the reverse (R) range.

In the case where the shift position is the reverse (R) range, the CPU makes a "Yes" determination in step 815 and proceeds to step 820 so as to determine whether or not a pedestrian(s) is contained in the heading direction image. In the case where a pedestrian(s) is contained in the heading direction image, the CPU makes a "Yes" determination in step 820 and proceeds to step 825. In step 825, the CPU executes the position obtainment process to thereby obtain the vertical position Dx and the horizontal position Dy of a "particular pedestrian among the pedestrians contained in the heading direction image." Subsequently, the CPU proceeds to step 830 so as to obtain the processed vertical position Dpx and the processed horizontal position Dpy of the pedestrian by executing a "position correction process routine" represented by a flowchart in FIG. 9. The position correction process routine" shown in FIG. 9 will be described later.

Figure 9:
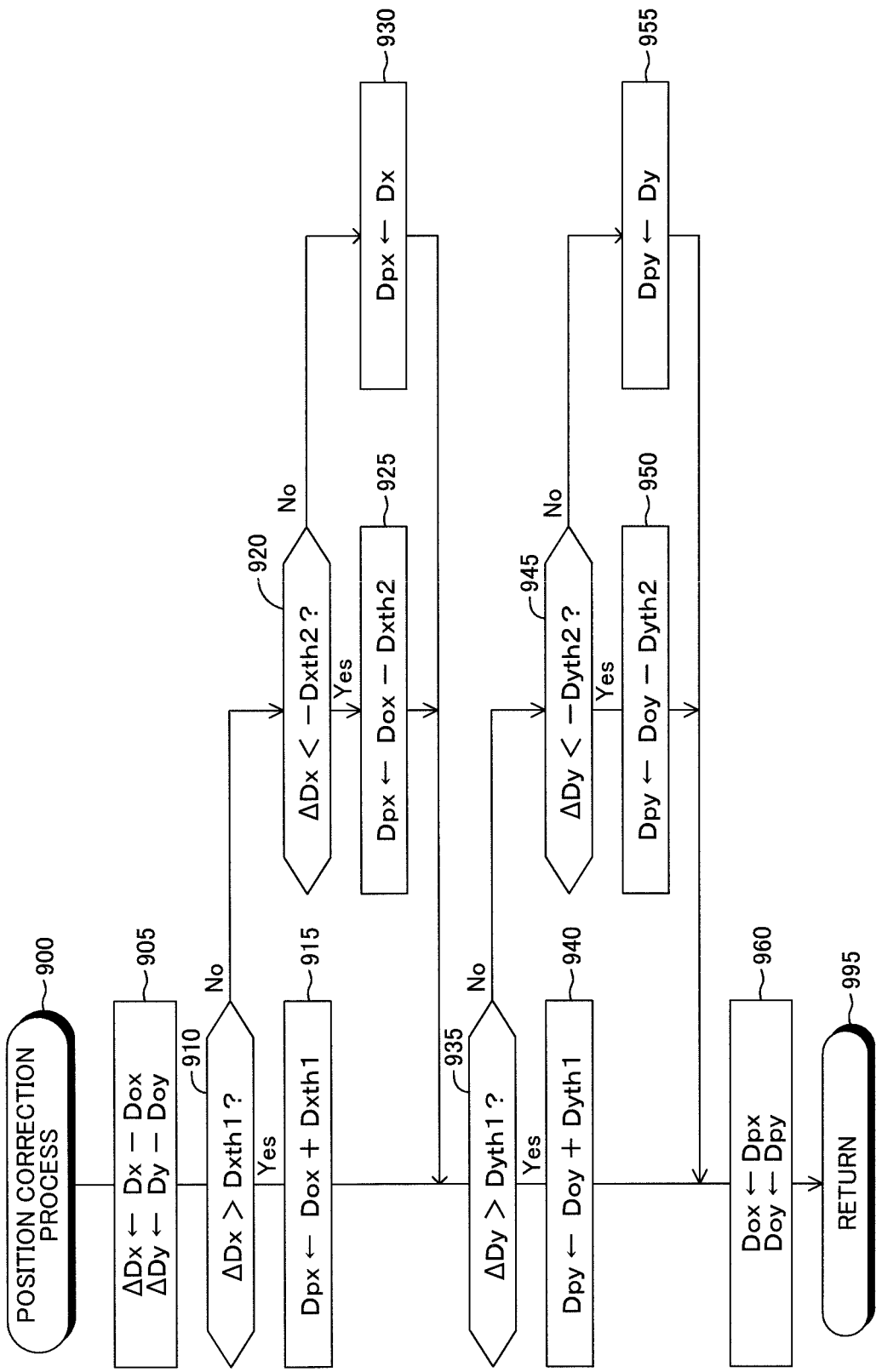
FIG. 9 is a flowchart representing a position correction process routine executed by the present monitoring apparatus.

After execution of the "position correction process routine" of FIG. 9, the CPU proceeds to step 835 so as to execute the position prediction process to thereby obtain the predicted vertical position Dfx and the predicted horizontal position Dfy. Further, the CPU proceeds to step 840 so as to determine whether or not the pedestrian is a pedestrian on path. Specifically, the CPU determines whether or not the above-described condition (A) and/or condition (B) is satisfied.

In the case where the condition (A) and/or the condition (B) is satisfied, the CPU makes a "Yes" determination in step 840 and proceeds to step 845. In step 845, the CPU obtains the required deceleration Dcreq in accordance with the above-described Equation (1) and stores the required deceleration Dcreq in the RAM while relating it with the particular pedestrian. Next, the CPU proceeds to step 850.

Meanwhile, in the case where none of the condition (A) and the condition (B) is satisfied, the CPU makes a "No" determination in step 840 and proceeds directly to step 850.

In step 850, the CPU determines whether or not the above-described process has been performed for all the pedestrians contained in the heading direction image. In the case where a pedestrian(s) for which the above-described process has not yet been performed remains, the CPU makes a "No" determination in step 850 and proceeds to step 825 after selecting a different pedestrian.

Meanwhile, in the case where the above-described process has been performed for all the pedestrians contained in the heading direction image, the CPU makes a "Yes" determination in step 850 and proceeds to step 855 so as to determine whether or not a pedestrian on path is present and the required deceleration Dcreq is greater than the acceleration threshold Ath. In the case where a plurality of required decelerations Dcreq have been obtained because of presence of a plurality of pedestrians on path, the CPU compares the maximum required deceleration Dcreq with the acceleration threshold Ath.

In the case where a pedestrian on path is present and the required deceleration Dcreq (or the maximum required deceleration Dcreq) is greater than the acceleration threshold Ath, the CPU makes a "Yes" determination in step 855 and proceeds to step 860 so as to notify the driver of the vehicle 10 that the possibility of collision with the pedestrian present in the backward direction of the vehicle 10 is high. Specifically, the CPU causes the input output device 46 to display a symbol which indicates that the possibility of collision with the pedestrian is high and causes the speakers 47 to reproduce a warning sound.

Next, the CPU proceeds to step 865 so as to start the automatic braking process. More specifically, the CPU transmits the required deceleration Dcreq to the brake ECU 32 through the CAN 34. In the case where a plurality of the required decelerations Dcreq have been obtained, the CPU transmits the maximum required deceleration Dcreq to the brake ECU 32. As a result, the brake ECU 32 controls the brake actuator 66 by executing an unillustrated routine such that the actual acceleration As becomes equal to the required deceleration Dcreq, whereby the required braking force Bf is generated.

Further, the CPU sets the value of the target drive torque Tqtgt to "0" and transmits the target drive torque Tqtgt to the engine ECU 31 through the CAN 34. As a result, the engine ECU 31 controls the engine actuators 63 and the transmission 64 by executing an unillustrated routine such that the actual drive torque Tq becomes equal to the target drive torque Tqtgt. Subsequently, the CPU proceeds to step 895.

Notably, in the case where the determination condition of step 810 is not satisfied (i.e., in the case where the automatic braking process has already been started), the CPU makes a "No" determination in step 810 and proceeds directly to step 895. Further, in the case where the determination condition of step 815 is not satisfied (i.e., in the case where the shift position is not the reverse (R) range), the CPU makes a "No" determination in step 815 and proceeds directly to step 895.

In addition, in the case where the determination condition of step 820 is not satisfied (i.e., in the case where the heading direction image contains no pedestrian), the CPU makes a "No" determination in step 820 and proceeds directly to step 895. Further, in the case where the determination condition of step 855 is not satisfied (i.e., in the case where the required deceleration Dcreq is equal to or less than the acceleration threshold Ath), the CPU makes a "No" determination in step 855 and proceeds directly to step 895.

Notably, in the case where a predetermined end condition is satisfied during execution of the automatic braking process, the CPU ends the automatic braking process and the notification to the driver through the input output device 46 and the speakers 47 by executing an unillustrated routine. The condition for ending the automatic braking process is a condition which is satisfied when the vehicle speed Vs becomes "0" and/or when the magnitude of change in the steering angle θs during execution of the automatic braking process becomes greater than a predetermined threshold.

Next, the "position correction process routine" will be described. When the CPU proceeds to step 830 of FIG. 8, the CPU starts the process from step 900 of FIG. 9 and proceeds to step 905 so as to calculate the vertical position difference ΔDx and the horizontal position difference ΔDy.

More specifically, the CPU obtains the vertical position difference ΔDx by subtracting the previous vertical position Dox from the vertical position Dx obtained when step 825 of FIG. 8 was executed latest. The previous vertical position Dox is the value which was stored in the RAM by the process of step 960 (to be described later) when the present routine was executed last time. Similarly, the CPU obtains the horizontal position difference ΔDy by subtracting the previous horizontal position Doy from the horizontal position Dy obtained when step 825 was executed latest. The previous horizontal position Doy is the value which was stored in the RAM by the process of step 960 when the present routine was executed last time.

Next, the CPU proceeds to step 910 so as to determine whether or not the vertical position difference ΔDx is larger than the first vertical limit value Dxth1. In the case where the vertical position difference ΔDx is larger than the first vertical limit value Dxth1, the CPU makes a "Yes" determination in step 910 and proceeds to step 915 so as to calculate (determine) the processed vertical position Dpx by adding the first vertical limit value Dxth1 to the previous vertical position Dox. Subsequently, the CPU proceeds to step 935.

Meanwhile, in the case where the vertical position difference ΔDx is equal to or smaller than the first vertical limit value Dxth1, the CPU makes a "No" determination in step 910 and proceeds to step 920 so as to determine whether or not the vertical position difference ΔDx is smaller than the value obtained by multiplying the second vertical limit value Dxth2 by "−1." In the case where the vertical position difference ΔDx is smaller than the value obtained by multiplying the second vertical limit value Dxth2 by "−1," the CPU makes a "Yes" determination in step 920 and proceeds to step 925 so as to calculate (determine) the processed vertical position Dpx by subtracting the second vertical limit value Dxth2 from the previous vertical position Dox. Subsequently, the CPU proceeds to step 935.

In the case where the vertical position difference ΔDx is equal to or larger than the value obtained by multiplying the second vertical limit value Dxth2 by "−1," the CPU makes a "No" determination in step 920 and proceeds to step 930 so as to determine the processed vertical position Dpx such that the processed vertical position Dpx becomes equal to the vertical position Dx. Subsequently, the CPU proceeds to step 935.

In step 935, the CPU determines whether or not the horizontal position difference ΔDy is larger than the first horizontal limit value Dyth1. In the case where the horizontal position difference ΔDy is larger than the first horizontal limit value Dyth1, the CPU makes a "Yes" determination in step 935 and proceeds to step 940 so as to calculate (determine) the processed horizontal position Dpy by adding the first horizontal limit value Dyth1 to the previous horizontal position Doy. Subsequently, the CPU proceeds to step 960.

Meanwhile, in the case where the horizontal position difference ΔDy is equal to or smaller than the first horizontal limit value Dyth1, the CPU makes a "No" determination in step 935 and proceeds to step 945 so as to determine whether or not the horizontal position difference ΔDy is smaller than the value obtained by multiplying the second horizontal limit value Dyth2 by "−1." In the case where the horizontal position difference ΔDy is smaller than the value obtained by multiplying the second horizontal limit value Dyth2 by "−1," the CPU makes a "Yes" determination in step 945 and proceeds to step 950 so as to calculate (determine) the processed horizontal position Dpy by subtracting the second horizontal limit value Dyth2 from the previous horizontal position Doy. Subsequently, the CPU proceeds to step 960.

In the case where the horizontal position difference ΔDy is equal to or larger than the value obtained by multiplying the second horizontal limit value Dyth2 by "−1," the CPU makes a "No" determination in step 945 and proceeds to step 955 so as to determine the processed horizontal position Dpy such that the processed horizontal position Dpy becomes equal to the horizontal position Dy. Subsequently, the CPU proceeds to step 960.

In step 960, the CPU stores the processed vertical position Dpx in the RAM as the previous vertical position Dox and stores the processed horizontal position Dpy in the RAM as the previous horizontal position Doy. Subsequently, the CPU proceeds to step 995 so as to end the present routine. Namely, the CPU proceeds to step 835 of FIG. 8.

As having been described above, even when the error in extraction of the contour of the pedestrian contained in the heading direction image captured by the rear camera 45 becomes large temporarily, the "positional relation between the vehicle 10 and a pedestrian (the vertical position and the horizontal position of the pedestrian)" recognized by the present monitoring apparatus can be prevented from greatly deviating from the actual positional relation. Therefore, the present monitoring apparatus can accurately determine whether or not the possibility of collision of the vehicle 10 with the pedestrian is high.

The embodiment of the vehicle surrounding monitoring apparatus according to the present invention has been described; however, the present invention is not limited to the above-described embodiment, and various modifications are possible without departing from the scope of the invention. For example, the surrounding monitoring ECU 20 according to the present embodiment executes the collision avoidance control when the vehicle 10 moves backward. However, the surrounding monitoring ECU 20 may execute the collision avoidance control when the vehicle 10 moves forward. In this case, the vehicle 10 includes an onboard camera (front camera) for capturing an image of a front region, and the front camera outputs to the surrounding monitoring ECU 20 a signal representing the captured image (heading direction image).

The surrounding monitoring ECU 20 according to the present embodiment executes the position correction process for both the vertical position Dx and the horizontal position Dy. However, the surrounding monitoring ECU 20 may execute the position correction process for only one of the vertical position Dx and the horizontal position Dy. For example, in the case where the surrounding monitoring ECU 20 executes the position correction process for the vertical position Dx only, the surrounding monitoring ECU 20 uses, as the processed horizontal position Dpy, the horizontal position Dy obtained by the position obtainment process as is.

The surrounding monitoring ECU 20 according to the present embodiment obtains the vertical position Dx and the horizontal position Dy of each pedestrian by executing the position obtainment process. However, instead of the vertical position Dx and the horizontal position Dy, the surrounding monitoring ECU 20 may obtain the angle of the pedestrian with respect to the vehicle 10 (the angle between the center axis Cs and a straight line connecting the origin and the position of the pedestrian) $\theta v$ and the direct distance Dv between the origin and the position of the pedestrian. In this case, the surrounding monitoring ECU 20 may execute the position correction process such that the magnitude of change in the angle $\theta v$ per time interval Ts does not exceed a predetermined angle threshold. In addition, the surrounding monitoring ECU 20 may execute the position correction process such that the amount of change in the direct distance Dv per time interval Ts does not exceed a predetermined distance threshold.

As shown in FIG. 4, the surrounding monitoring ECU 20 according to the present embodiment changes the distance threshold Dth (i.e., the first vertical limit value Dxth1, the second vertical limit value Dxth2, the first horizontal limit value Dyth1, and the second horizontal limit value Dyth2) in accordance with the vehicle speed Vs. However, some of or all the first vertical limit value Dxth1, the second vertical limit value Dxth2, the first horizontal limit value Dyth1, and the second horizontal limit value Dyth2 may be fixed values irrespective of the vehicle speed Vs.

The surrounding monitoring ECU 20 according to the present embodiment determines that a pedestrian satisfying either one or both of the condition (A) and the condition (B) is a pedestrian on path. However, the process of determining whether or not the pedestrian satisfies the condition (B) may be omitted.

The surrounding monitoring ECU 20 according to the present embodiment determines that when the required deceleration Dcreq is greater than the acceleration threshold Ath, the possibility of collision with the pedestrian on path is high. However, the surrounding monitoring ECU 20 may determine whether or not the possibility of collision with the pedestrian on path is high by a method different from the method employed in the embodiment. For example, the surrounding monitoring ECU 20 may obtain a time (time to collision) until the vehicle 10 collides with the pedestrian on path under the assumption that the vehicle speed Vs is constant, and determine that the possibility of collision with the pedestrian on path is high if the time to collision is shorter than a predetermined time.

In the present embodiment, no limitation is imposed on the length of the path region Ap. However, the path region Ap extending rearward from the vehicle 10 may have a limited length. In this case, when a pedestrian on path contained in the path region Ap is present, the surrounding monitoring ECU 20 may determine that the possibility of collision of the vehicle 10 with the pedestrian on path is high without calculating the required deceleration Dcreq.

In the present embodiment, when the surrounding monitoring ECU 20 determines that the possibility of collision of the vehicle 10 with the pedestrian on path is high, the surrounding monitoring ECU 20 controls the engine ECU 31 and the brake ECU 32 such that the actual acceleration As becomes equal to the required deceleration Dcreq. However, when the surrounding monitoring ECU 20 determines that the possibility of collision of the vehicle 10 with the pedestrian on path is high, the surrounding monitoring ECU 20 may control the brake ECU 32 such that the brake actuator 66 generates the "maximum frictional braking force within a range within which no slippage occurs between a road surface and the wheels of the vehicle 10" irrespective of the value of the required deceleration Dcreq.

The surrounding monitoring ECU 20 according to the present embodiment obtains the vertical position Dx and the horizontal position Dy of each pedestrian by executing the position obtainment process. However, the position obtainment process may be executed by an apparatus different from the surrounding monitoring ECU 20 (for example, a camera ECU). In this case, the surrounding monitoring ECU 20 receives from the camera ECU a signal representing the vertical position Dx and the horizontal position Dy of each pedestrian.

When the surrounding monitoring ECU 20 according to the present embodiment determines that the possibility of collision with a pedestrian is high, the surrounding monitoring ECU 20 executes the automatic braking process and the notification (warning) to the driver of the vehicle 10. However, one of the notification to the driver and the automatic braking process may be omitted.

What is claimed is:
1. A surrounding monitoring apparatus comprising:
    one camera which is mounted on a vehicle and which obtains a heading direction image by photographing a region in a heading direction of said vehicle; and
    an electronic control unit which is implemented by at least one programmed processor and which is configured to realize a pedestrian position obtainment step, a position processing step, and a collision determination step, wherein said pedestrian position obtainment step which executes a position obtainment process every time a predetermined time interval elapses so as to obtain a position correlation value representing a position of a pedestrian with respect to said vehicle on the basis of a position of said pedestrian in said heading direction image;

said position processing step which operates every time said position correlation value is obtained so as to determine a position processed value on the basis of said obtained position correlation value; and said collision determination step which determines, at a first time point when said position processed value is newly determined, whether or not a possibility of collision of said vehicle with said pedestrian is high on the basis of said newly determined position processed value, wherein said position processing step is configured such that when said position correlation value obtained at said first time point is larger than a first specific value obtained by adding a predetermined first limit value to said position processed value at a second time point which precedes said first time point by said time interval, said position processing step sets said position processed value at said first time point to be equal to said first specific value;

when said position correlation value obtained at said first time point is smaller than a second specific value obtained by subtracting a predetermined second limit value from said position processed value at said second time point, said position processing step sets said position processed value at said first time point to be equal to said second specific value; and when said position correlation value obtained at said first time point is equal to or smaller than said first specific value and is equal to or larger than said second specific value, said position processing step sets said position processed value at said first time point to be equal to said position correlation value obtained at said first time point.

2. A surrounding monitoring apparatus according to claim 1, wherein said position processing step is configured to change at least one of said first limit value and said second limit value such that said at least one limit value increases with the magnitude of travel speed of said vehicle.

3. A surrounding monitoring apparatus according to claim 1, wherein said camera is configured to obtain said heading direction image such that the longer the distance between said vehicle and an object present in said heading direction, the higher the position of said object in said heading direction image; and said pedestrian position obtainment step is configured to obtain, as said position correlation value, a value representing the distance between said vehicle and said pedestrian in said vehicle heading direction, and is configured to obtain said position correlation value such that the higher the position of a foot of said pedestrian in said heading direction image, the greater said distance represented by said position correlation value.

4. A surrounding monitoring apparatus according to claim 1, wherein said collision determination step is configured to employ, as a necessary condition for determining that the possibility of collision of said vehicle with said pedestrian is high, a condition that said position processed value is a value representing a position within a path region through which said vehicle is expected to pass as a result of traveling.

5. A surrounding monitoring apparatus according to claim 2, wherein said collision determination step is configured to employ, as a necessary condition for determining that the possibility of collision of said vehicle with said pedestrian is high, a condition that said position processed value is a value representing a position within a path region through which said vehicle is expected to pass as a result of traveling.

6. A surrounding monitoring apparatus according to claim 3, wherein said collision determination step is configured to employ, as a necessary condition for determining that the possibility of collision of said vehicle with said pedestrian is high, a condition that said position processed value is a value representing a position within a path region through which said vehicle is expected to pass as a result of traveling.

7. A surrounding monitoring apparatus according to claim 1, wherein said collision determination step is configured to estimate, on the basis of said position processed value, a predicted position which is the position of said pedestrian with respect to said vehicle after elapse of a predetermined prediction time.

8. A surrounding monitoring apparatus according to claim 2, wherein said collision determination step is configured to estimate, on the basis of said position processed value, a predicted position which is the position of said pedestrian with respect to said vehicle after elapse of a predetermined prediction time, and to employ, as a necessary condition for determining that the possibility of collision of said vehicle with said pedestrian is high, a condition that said predicted position is a position within a path region through which said vehicle is expected to pass as a result of traveling.

9. A surrounding monitoring apparatus according to claim 3, wherein said collision determination step is configured to estimate, on the basis of said position processed value, a predicted position which is the position of said pedestrian with respect to said vehicle after elapse of a predetermined prediction time, and to employ, as a necessary condition for determining that the possibility of collision of said vehicle with said pedestrian is high, a condition that said predicted position is a position within a path region through which said vehicle is expected to pass as a result of traveling.

10. A surrounding monitoring apparatus according to claim 4, wherein said collision determination step is configured to estimate, on the basis of said position processed value, a predicted position which is the position of said pedestrian with respect to said vehicle after elapse of a predetermined prediction time, and to employ, as a necessary condition for determining that the possibility of collision of said vehicle with said pedestrian is high, a condition that said predicted position is a position within a path region through which said vehicle is expected to pass as a result of traveling.

11. A surrounding monitoring apparatus according to claim 5, wherein said collision determination step is configured to estimate, on the basis of said position processed value, a predicted position which is the position of said pedestrian with respect to said vehicle after elapse of a predetermined prediction time, and to employ, as a necessary condition for determining that the possibility of collision of said vehicle with said pedestrian is high, a condition that said predicted position is a position within a path region through which said vehicle is expected to pass as a result of traveling.

12. A surrounding monitoring apparatus according to claim 6, wherein said collision determination step is configured to estimate, on the basis of said position processed value, a predicted position which is the position of said pedestrian with respect to said vehicle after elapse of a predetermined prediction time, and to employ, as a necessary condition for determining that the possibility of collision of said vehicle with said pedestrian is high, a condition that said predicted position is a position within a path region through which said vehicle is expected to pass as a result of traveling.

* * * * *